US012783162B2

(12) United States Patent
Eto et al.

(10) Patent No.: US 12,783,162 B2
(45) Date of Patent: Nov. 3, 2026

(54) DATA PROCESSING METHOD AND DATA PROCESSING DEVICE

(71) Applicant: Kabushiki Kaisha Toshiba, Tokyo (JP)

(72) Inventors: Koichi Eto, Kawasaki (JP); Yasuhiro Fukuju, Yokohama (JP); Koji Kitayama, Shinagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 19/056,562

(22) Filed: Feb. 18, 2025

(65) Prior Publication Data

US 2025/0306795 A1 Oct. 2, 2025

(30) Foreign Application Priority Data

Apr. 1, 2024 (JP) ................................ 2024-059243

(51) Int. Cl.
*G06F 3/06* (2006.01)

(52) U.S. Cl.
CPC .......... *G06F 3/0655* (2013.01); *G06F 3/0616* (2013.01); *G06F 3/0679* (2013.01)

(58) Field of Classification Search
CPC ..... G06F 3/0655; G06F 3/0616; G06F 3/0679
See application file for complete search history.

(56) References Cited

U.S. PATENT DOCUMENTS 9,448,798 B1 * 9/2016 Bose .................... G06F 9/30043
2009/0210633 A1 * 8/2009 Kundinger .......... G06F 12/0833 711/141
2019/0042108 A1 * 2/2019 Doshi .................... G06F 3/0625
2019/0384707 A1 * 12/2019 Doshi .................... G06F 3/0613
2022/0137860 A1 * 5/2022 Zhuo ...................... G06F 3/0655 711/154

FOREIGN PATENT DOCUMENTS

JP 2019-101917 A1 6/2019

* cited by examiner

*Primary Examiner* — Michael Alsip
(74) *Attorney, Agent, or Firm* — Knobbe, Martens, Olson & Bear, LLP

(57) ABSTRACT

According to an embodiment, there is provided a data processing method when a storage medium includes a volatile storage unit and a non-volatile storage unit, the data processing method comprising: designating the volatile storage unit as an upper layer and the non-volatile storage unit as a lower layer to apply overlay processing to at least a part of the storage medium, storing data in the volatile storage unit, canceling the overlay processing being applied, discriminating, based on a predetermined condition, the data into a first data group that is subject to persistence and a second data group that is not subject to persistence, and storing data of the first data group in the non-volatile storage unit.

8 Claims, 9 Drawing Sheets

DATA PROCESSING METHOD AND DATA PROCESSING DEVICE

CROSS-REFERENCE TO RELATED APPLICATION

This application is based upon and claims the benefit of priority from Japanese Patent Application No. 2024-059243, filed Apr. 1, 2024, the entire contents of which are incorporated herein by reference.

FIELD

Embodiments of the present invention relate generally to a data processing method and a data processing device.

BACKGROUND

In many devices utilized for internet of things (IoT), a storage medium using a flash memory is adopted as an auxiliary storage device. However, a flash memory has a life span, and, in industrial and infrastructure fields, it is necessary to particularly reduce a number of times of writing to extend the life span.

DETAILED DESCRIPTION

Figure 1:
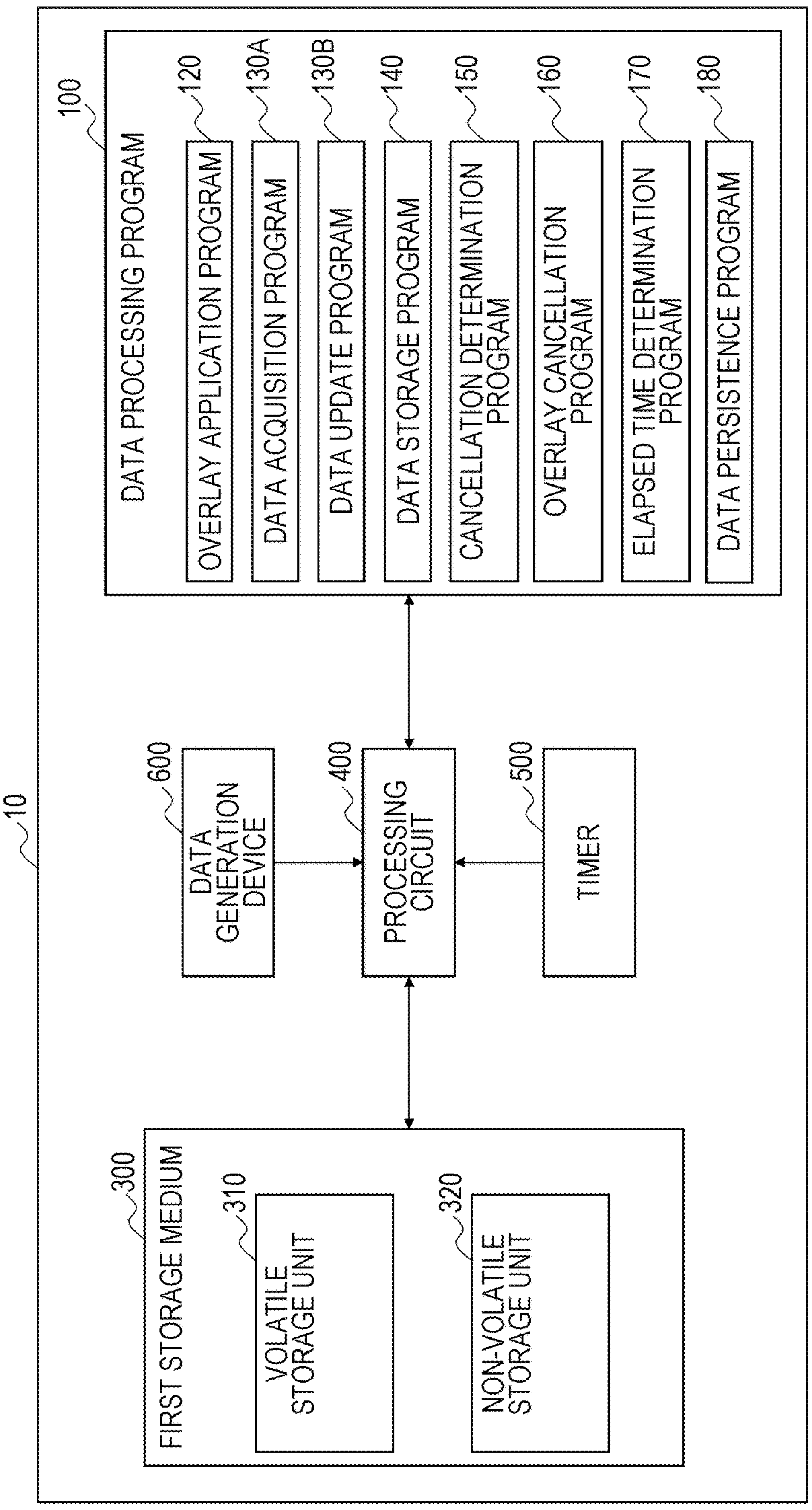
FIG. 1 is a block diagram illustrating a schematic example of a data processing device according to an embodiment.

According to an embodiment, there is provided a data processing method when a storage medium includes a volatile storage unit and a non-volatile storage unit, the data processing method comprising: designating the volatile storage unit as an upper layer and the non-volatile storage unit as a lower layer to apply overlay processing to at least a part of the storage medium, storing data in the volatile storage unit, canceling the overlay processing being applied, discriminating, based on a predetermined condition, the data into a first data group that is subject to persistence and a second data group that is not subject to persistence, and storing data of the first data group in the non-volatile storage unit.

Embodiments will now be described with reference to the accompanying drawings. Note that, in below descriptions, components that exert identical or similar functions are applied with identical reference numerals throughout all the drawings, and redundant descriptions will be omitted. Furthermore, each drawing is a schematic diagram for describing each of the embodiments and for facilitating its understanding, and, although there are differences in shape, size, and ratio, for example, from those of an actual device, it is possible to appropriately make modifications in design by taking into consideration the below descriptions and known techniques.

The present embodiment of the invention uses a method for applying an overlay to a storage region as a method for reducing an amount of data written in a non-volatile storage medium such as a flash memory. It is possible to both read and write data from and in an upper layer of the overlay, and it is only possible to read data from a lower layer. When a non-volatile storage medium is designated as the lower layer of the overlay and a volatile storage medium is designated and applied as the upper layer, no data is written in the non-volatile storage medium, and data is written only in the volatile storage medium. As a result, it is possible to reduce an amount of writing in the non-volatile storage medium.

When a power source of a device equipped with both the volatile storage medium and the non-volatile storage medium is turned off, the data in the volatile storage medium is erased. Therefore, to hold the data in a persistence manner, it is necessary to cancel the overlay and reflect the data in the non-volatile storage medium. On the other hand, data for which persistence is required and data for which persistence is not required are mixed in the volatile storage medium, and writing a piece of unnecessary data in the non-volatile storage medium leads to deterioration of the flash memory. Therefore, in the present embodiment of the invention, a method for using an overlay to save only data for which persistence is required in a non-volatile storage medium is adopted.

Furthermore, in each of the embodiments, conditions for performing determination differ from each other. Therefore, a type and a number of pieces of data that is subject to persistence are not identical to each other, but may be different from each other in each of the embodiments.

Persistence referred herein means storage in the non-volatile storage unit.

First Embodiment

FIG. 1 is a block diagram illustrating a schematic example of a data processing device according to an embodiment. A data processing device 10 includes a data processing program 100, a first storage medium 300, and a processing circuit 400. The data processing device 10 may further include a timer 500 and a data generation device 600. The data processing program 100 includes an overlay application program 120 capable of applying overlay processing to the first storage medium 300, a data acquisition program 130A capable of acquiring data from the data generation device 600, a data update program 130B capable of executing data update, a data storage program 140 capable of storing the data in the first storage medium 300, a cancellation determination program 150 capable of an determining cancellation of the overlay processing, overlay cancellation program 160 capable of canceling the overlay processing being applied, an elapsed time determination program 170 capable of determining whether or not to store the data in a non-volatile storage unit in accordance with an elapsed time of the data, and a data persistence program 180 capable of executing storage of data that is subject to persistence in the non-volatile storage unit. The first storage medium 300 includes a volatile storage unit 310 and a non-volatile storage unit 320.

It is possible to store the data processing program 100 in the first storage medium 300 or in another non-illustrated storage medium. Furthermore, it is sufficient that the data processing program 100 is capable of executing an instruction issued from the processing circuit 400. Therefore, the program may be stored in different storage media or may be run in a cloud manner.

The first storage medium 300 is a storage device called a main storage device or an auxiliary storage device. The first storage medium 300 is, for example, a semiconductor memory. The volatile storage unit 310 is, for example, a random access memory (RAM). The non-volatile storage unit 320 is, for example, a flash memory. However, an overlay technique is applied to the first storage medium 300 to suppress deterioration of the flash memory. In here, the volatile storage unit 310 serves as an upper layer, and the non-volatile storage unit 320 serves as a lower layer. It is possible to apply the overlay technique to only a part of the storage medium. Therefore, data for which persistence is essential, such as software, may be included in an operating system (OS) in the first storage medium 300, or may be included in another storage medium. In the former case, an overlay is applied to a partial region of the storage medium excluding a storage region for data for which persistence is essential. In the latter case, application to a full region of the storage medium is possible.

The processing circuit 400 includes a processor or an integrated circuit, for example, and the processor forming the processing circuit 400 includes any one of a central processing unit (CPU), an application specific integrated circuit (ASIC), a microcomputer (or a microcontroller or a microcontroller unit), a field programmable gate array (FPGA), and a digital signal processor (DSP). The processing circuit 400 may include one processor or may include a plurality of processors, for example. The processing circuit 400 executes the data processing program 100 to perform processing described later for controlling the first storage medium 300.

The timer 500 is capable of measuring a time when data is updated.

The data generation device 600 generates data to be stored in the first storage medium. Data to be generated includes Data A and Data B described later, for example.

Figure 2:
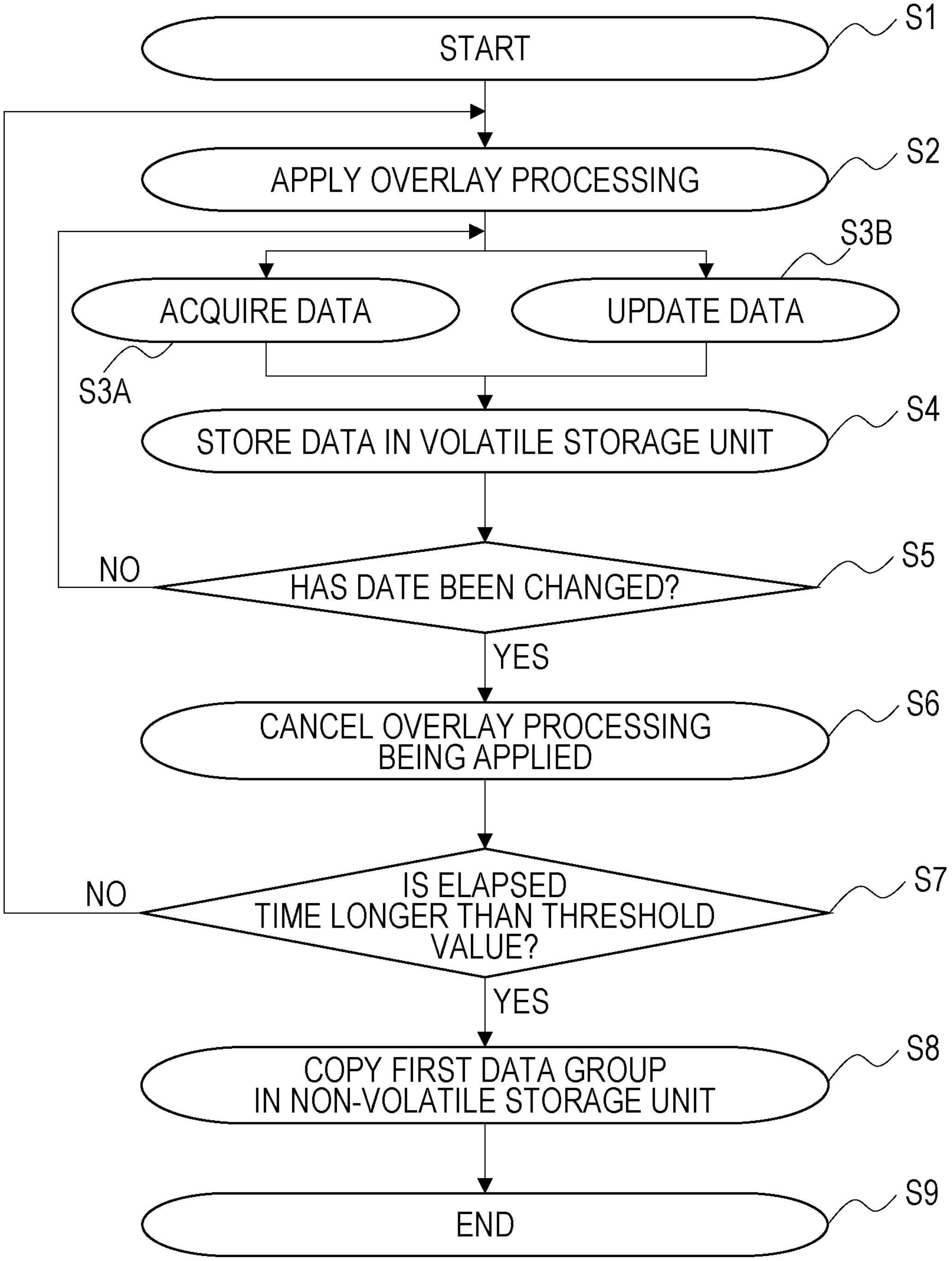
FIG. 2 is a flowchart illustrating an example of a flow of a data processing method according to the embodiment.

A flow of a data processing method according to the embodiment will now be described herein with reference to FIGS. 2 and 3. In here, although a case where data varying in two types will be described, data may vary in two or more types. The same applies to embodiments described later. FIG. 2 is a flowchart illustrating an example of the flow of the data processing method according to the embodiment. Note that the present flowchart is a mere example, and an order in the processing is not limited, as long as it is possible to acquire a required result of processing, for example. Furthermore, each result of processing may be sequentially stored in the first storage medium 300, and, in each step, a result of processing may be acquired by referring to the first storage medium 300. The same applies to flowcharts described later.

Figure 3B:
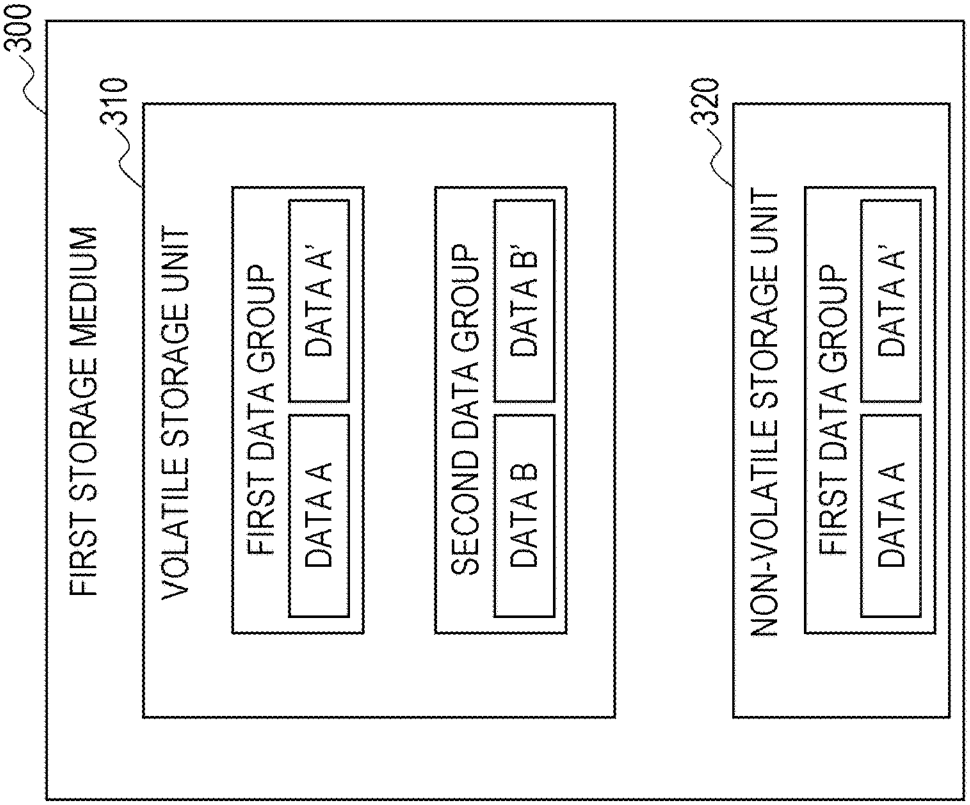
FIG. 3B is a schematic diagram illustrating a state of the first storage medium after the data processing method according to the embodiment.
Figure 3A:
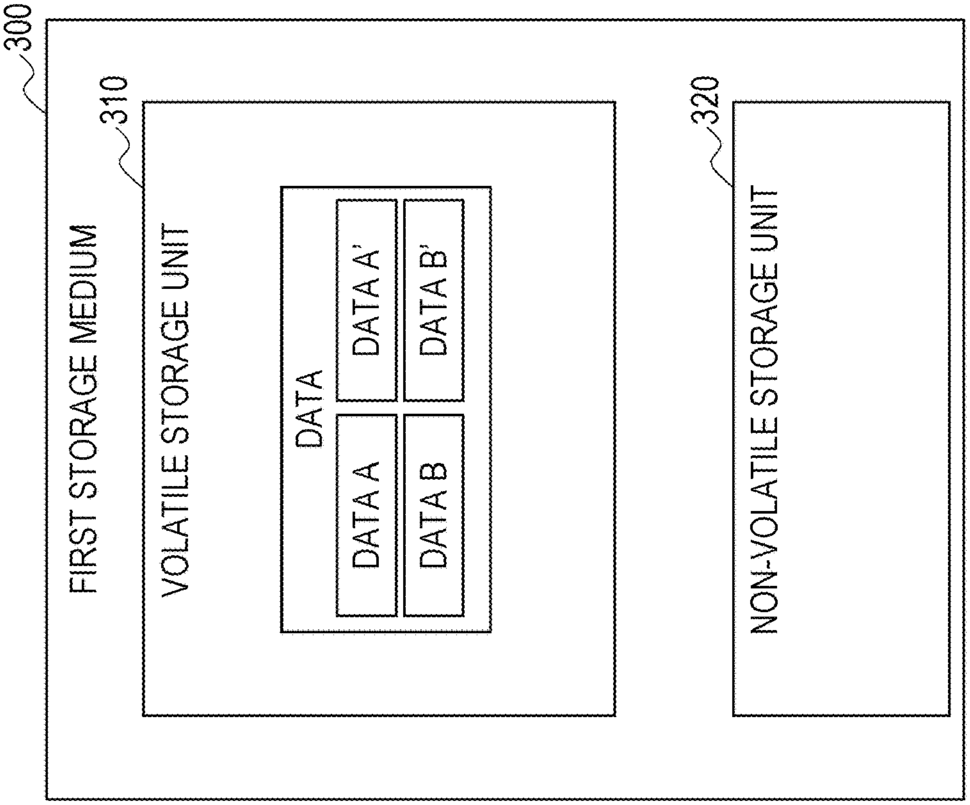
FIG. 3A is a schematic diagram illustrating a state of the first storage medium in S6 illustrated in FIG. 2 in the data processing method according to the embodiment.

FIGS. 3A and 3B are schematic diagrams illustrating a situation of data processing for the first storage medium 300 in the first embodiment, and FIG. 3A illustrates a state of the first storage medium 300 in S6 illustrated in FIG. 2 in the data processing method according to the embodiment. There is a plurality of pieces of data in the volatile storage unit 310. The plurality of pieces of data includes Data A and Data B and Data A' and Data B' acquired after updating Data A and Data B, respectively. FIG. 3B illustrates a state of the first storage medium 300 after the data processing method according to the embodiment is performed (S9). The volatile storage unit 310 includes a first data group and a second data group. The non-volatile storage unit 320 includes the first data group. The first data group includes Data A and Data A', and the second data group includes Data B and Data B'. In FIG. 3A, the volatile storage unit 310 may include only data that serves as the first data group in FIG. 3B, such as Data A and/or Data A'.

In here, Data A refers to data determined that writing in the non-volatile storage unit 320 is essential in determination of persistence described later. For example, Data A is important data such as data related to a destination of a path for software, a certificate, or a program code. On the other hand, Data B refers to data determined that writing in the non-volatile storage unit 320 is not always necessary, and is data updated more frequently than Data A. For example, it is data lower in degree of importance than Data A, such as maintenance data or a temporary file. Reducing a number of times of writing of Data B makes it possible to achieve an extended life span of the non-volatile storage unit 320.

In here, an example in which an elapsed time from a last update time of the data is used as a material for determining persistence of data will be described. In a case where there is a plurality of types of data, each piece of the data is more frequently updated as an elapsed time is shorter, is regarded as temporary data, and is excluded from those subject to persistence.

Now back to FIG. 2, in S2, the processing circuit 400 reads and executes the overlay application program 120 to apply, to the first storage medium 300, the overlay processing where the volatile storage unit 310 serves as the upper layer and the non-volatile storage unit 320 serves as the lower layer. While the overlay processing is applied, data is stored only in the volatile storage unit 310. When there is no data in the volatile storage unit 310, the flow proceeds to S3A. When there is already data in the volatile storage unit 310, the flow is able to proceed to S3A to acquire new data, or the flow is able to proceed to S3B to update the existing data.

In S3A, the processing circuit 400 reads and executes the data acquisition program 130A to acquire data generated by the data generation device 600.

In S3B, the processing circuit 400 reads and executes the data update program 130B to update the data stored in the volatile storage unit 310. The data update may be overwriting and saving, or may be newly creating updated data. In here, the latter will be described.

In S4, the processing circuit 400 reads and executes the data storage program 140 to store the data acquired in S3A or the data updated in S3B in the volatile storage unit 310. At this time, a date and time acquired by using the timer 500 is additionally stored. This date and time is a date and time when the data storage program 140 has stored the data in the volatile storage unit 310, and is used in determination of persistence of the data, described later.

In S5, the processing circuit 400 reads and executes the cancellation determination program 150 to determine cancellation of the overlay processing being applied. As a timing for determination, for example, it is possible to use a change in date. When a change in date is used as a timing for determination, for example, the timer 500 is used to determine whether or not the date has changed. When the date has changed, the flow proceeds to S6 (Yes), and, when the date has not yet changed, the flow returns to S3A or S3B (No). Acquisition or/and update and storage of the data are continued until the date is changed.

In S6, the processing circuit 400 reads and executes the overlay cancellation program 160 to cancel the overlay processing being applied to the first storage medium 300. After that, acquisition and update of data are not performed. Furthermore, writing of data in the non-volatile storage unit 320 becomes possible.

In S7, the processing circuit 400 reads and executes the elapsed time determination program 170 to determine whether or not to persist each piece of the data in the volatile storage unit 310, in other words, whether or not to store each piece of data in the volatile storage unit 310 in the non-volatile storage unit 320. When an elapsed time from a last update time of the data to execution of the elapsed time determination program 170 is longer than a predetermined threshold value (Yes), the flow proceeds to S8. When the elapsed time is shorter than the threshold value (No), the flow returns to S2. This determination is performed for all the pieces of data. In here, data that is not to be stored in the non-volatile storage unit 320 may be subject to persistence when a next determination is performed after returning to S2. As the threshold value, it is possible to use an identical value for all the pieces of data in the volatile storage unit 310. It is possible to appropriately change the threshold value in accordance with a type of data or a type of a folder or a capacity of the first storage medium 300. The same applies to threshold values described later.

Description will be given with reference to FIG. 3B. Since a data update frequency for Data A is lower than that for Data B, its elapsed time becomes longer. The first data group includes a piece of data that is not frequently updated, such as Data A and Data A' acquired after Data A is updated.

In S8, the processing circuit 400 reads and executes the data persistence program 180 to copy only the first data group among the pieces of data stored in the volatile storage unit 310 to the non-volatile storage unit 320. The first data group stored in the volatile storage unit 310 may be at least stored in and may be written in the non-volatile storage unit 320.

As described above, with the data processing program according to the first embodiment, a piece of data for which persistence is required and a piece of data for which persistence is not required are separated from each other, with respect to a storage region to which the overlay processing has been applied, and, after that, the overlay processing being applied is temporarily canceled and only a piece of necessary data is written in the non-volatile storage unit 320, making it possible to suppress deterioration of the flash memory for an extended life span.

Second Embodiment

In a data processing method according to a second embodiment, it is assumed to handle a container platform that is a platform for supporting development and operation of an application utilizing a container virtualization technique that is one of server virtualization techniques. A piece of data (a container) that the container platform outputs is a combination of an operating environment of a device and an application. To execute the container, a container image that is a piece of data such as a setting file or a program source is required. When the container is executed, a container instance that is an environment in which an application actually operates is generated. The container instance may change in state when the container image is executed, and a log file or a temporary file, for example, pertaining to the application may be generated. Therefore, the container instance does not need to be saved in a persistence manner, and it is sufficient that only the container image be saved. That is, the container image is a piece of data for which persistence is required, and the container instance is a piece of data for which persistence is not required. In the first embodiment, the first data group corresponds to a container image, and the second data group corresponds to a container instance.

Figure 4:
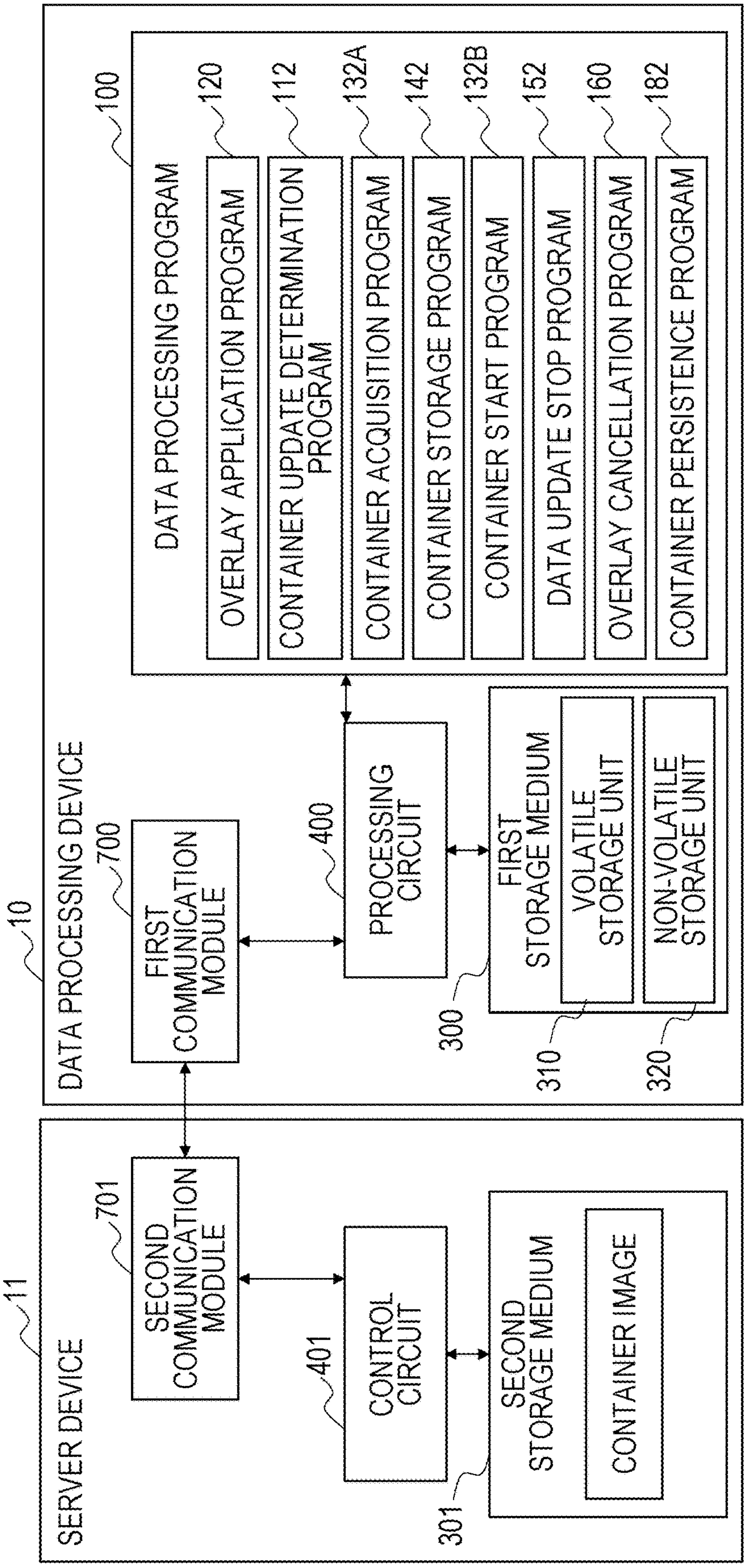
FIG. 4 is a block diagram illustrating a schematic example of the data processing device according to the embodiment and a server device.

FIG. 4 is a block diagram illustrating a schematic example of the data processing device according to the embodiment and a server device. The data processing device 10 includes the data processing program 100, the first storage medium 300, the processing circuit 400, and a first communication module 700. A server device 11 includes a second storage medium 301, a control circuit 401, and a second communication module 701. The second storage medium 301 includes a container image. The data processing program 100 includes the overlay application program 120, a container update determination program 112 capable of determining whether or not the container image in the second storage medium 301 has been updated, a container acquisition program 132A capable of acquiring the container from the second storage medium 301, a container start program 132B capable of starting the acquired container, a container storage program 142 capable of executing storage of the container image and the container instance in the volatile storage unit 310, a data update stop program 152 capable of stopping data update of the container, the overlay cancellation program 160, and a container persistence program 182 capable of identifying the container image stored in the volatile storage unit 310 and executing storage of the container image in the non-volatile storage unit 320.

The second storage medium 301 is a storage device called a main storage device or an auxiliary storage device. Examples of the second storage medium 301 include a magnetic disk, an optical disk (including a compact disc-read only memory (CD-ROM), a compact disc-recordable (CD-R), and a digital versatile disc (DVD)), a magneto-optical disk (including a magnet optical (MO)), and a semiconductor memory.

The control circuit 401 includes a processor or an integrated circuit, for example, and includes any one of a CPU, an ASIC, a microcomputer, an FPGA, and a DSP, for example, as the processor forming the control circuit 401. The control circuit 401 may include, for example, one processor or may include a plurality of processors. In accordance with an instruction from the processing circuit 400 in the data processing device 10, the control circuit 401 performs processing described later in updating the container image stored in the second storage medium 301.

The first communication module 700 and the second communication module 701 each include a communication interface, for example. The processing circuit 400 communicates with the second communication module 701 in the server device 11 via the first communication module 700.

Figure 5:
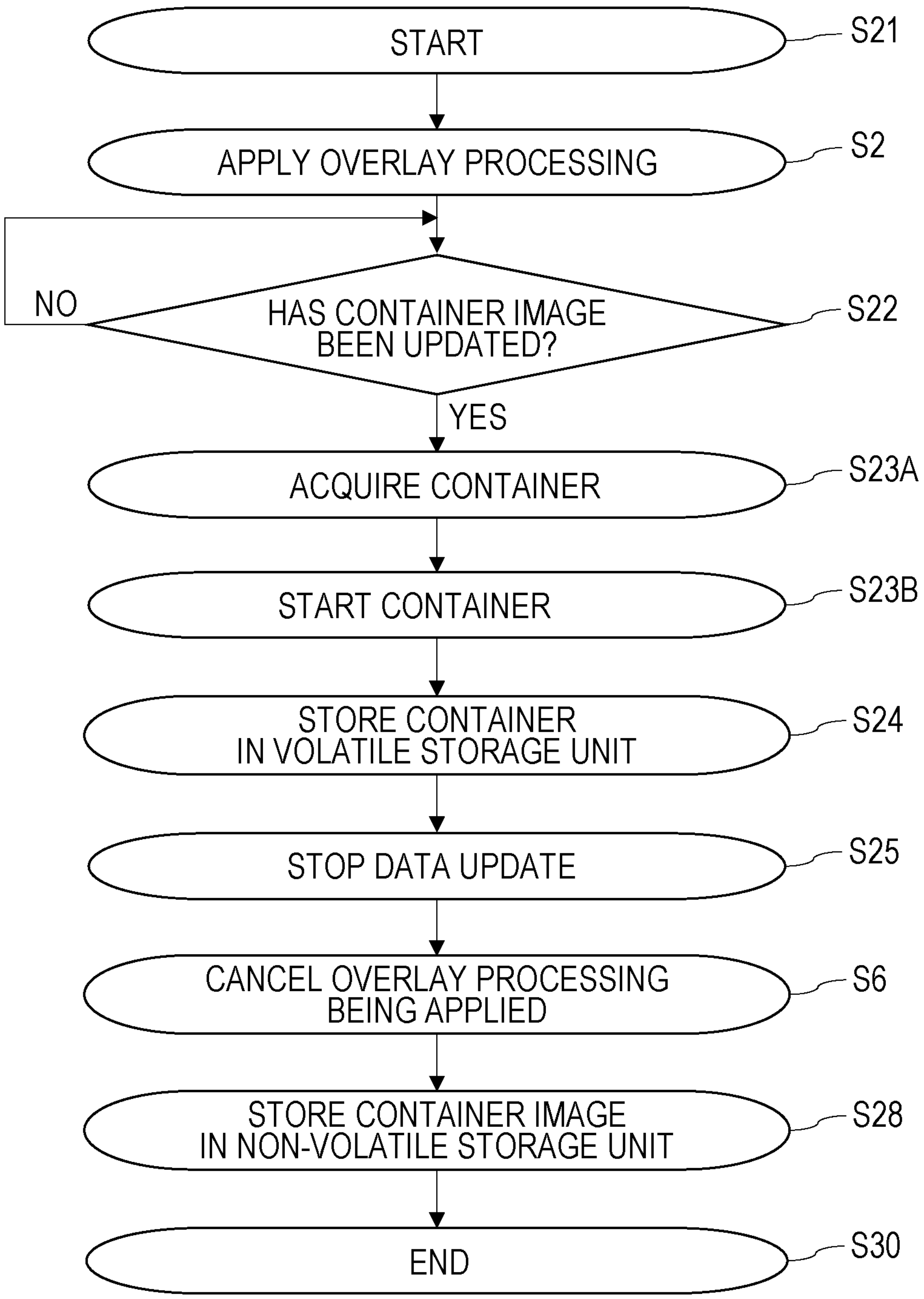
FIG. 5 is a flowchart illustrating a modification of the flow of the data processing method according to the embodiment.

A flow of the data processing method according to the embodiment will now be described herein. In here, FIG. 5 is a flowchart illustrating a modification of the flow of the data processing method according to the embodiment. Since S2 and S6 are similar or identical to those in the data processing method described in the first embodiment, S22 to S25 and S28 will now be described herein.

In S22, the processing circuit 400 reads and executes the container update determination program 112 to determine whether or not the container image stored in the second storage medium 301 has been updated using the control circuit 401. When the container image has been updated (Yes), the flow proceeds to S23A. When the container image has not yet been updated (No), S22 is repeated until the container image is updated.

In S23A, the processing circuit 400 reads and executes the container acquisition program 132A to acquire the container image from the second storage medium 301 using the control circuit 401.

In S23B, the processing circuit 400 reads and executes the container start program 132B to start the container. When the container is started, a container image and a container instance that is an aggregate of pieces of temporary data necessary for operation of the container are generated.

In S24, the processing circuit 400 reads and executes the container storage program 142 to store the container image and the container instance generated in S23 in the volatile storage unit 310.

In S25, the processing circuit 400 reads and executes the data update stop program 152 to stop updating of the container image. After that, for example, neither acquisition of new data nor update of data is performed.

In S28, the processing circuit 400 reads and executes the container persistence program 182 to identify whether or not there is a container image among the pieces of data stored in the volatile storage unit 310 and to copy only the container image in the non-volatile storage unit 320. The container image stored in the volatile storage unit 310 may be at least stored in and may be written and saved in the non-volatile storage unit 320.

With the configuration of the data processing program as described above, writing only a container image in the non-volatile storage unit 320 makes it possible to suppress writing of data for which persistence is not required, and to avoid oppression of a capacity of the flash memory.

Third Embodiment

As a modification of the first embodiment, an example in which a data capacity is used as a material for determining persistence of data will now be described herein. In here, when pieces of data that differ in type from each other are compared with each other, one with a larger data capacity is set to be subject to persistence. One reason of this determination is that it is considered that, as the data capacity increases, more information be included.

Figure 6:
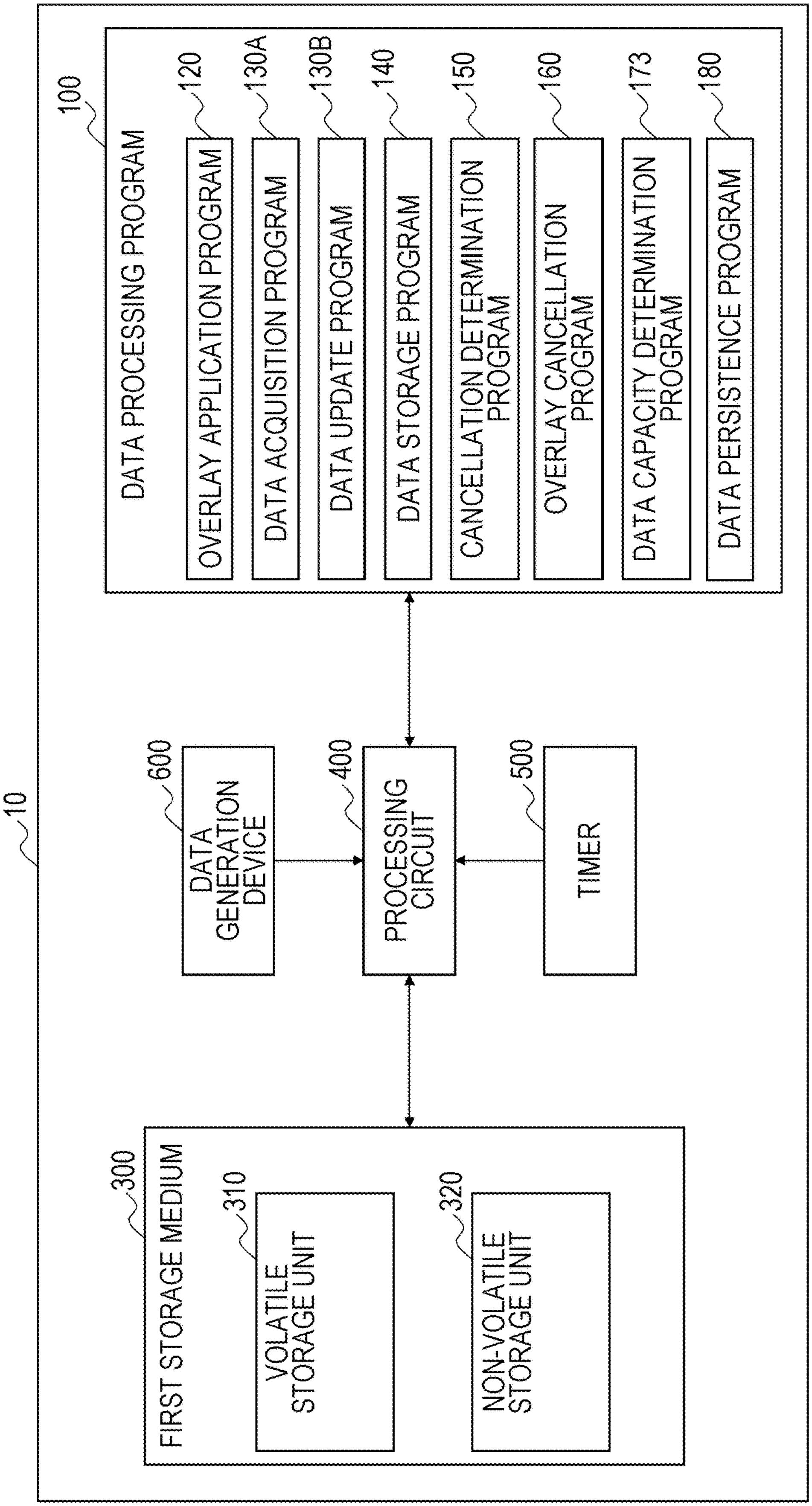
FIG. 6 is a block diagram illustrating a schematic modification of the data processing device according to the embodiment.

FIG. 6 is a block diagram illustrating a schematic modification of the data processing device according to the embodiment. The data processing device 10 according to the third embodiment includes a data capacity determination program 173 used to perform determination of persistence in accordance with a capacity of data, instead of the elapsed time determination program 170 in the data processing program 100 illustrated in FIG. 1.

Figure 7:
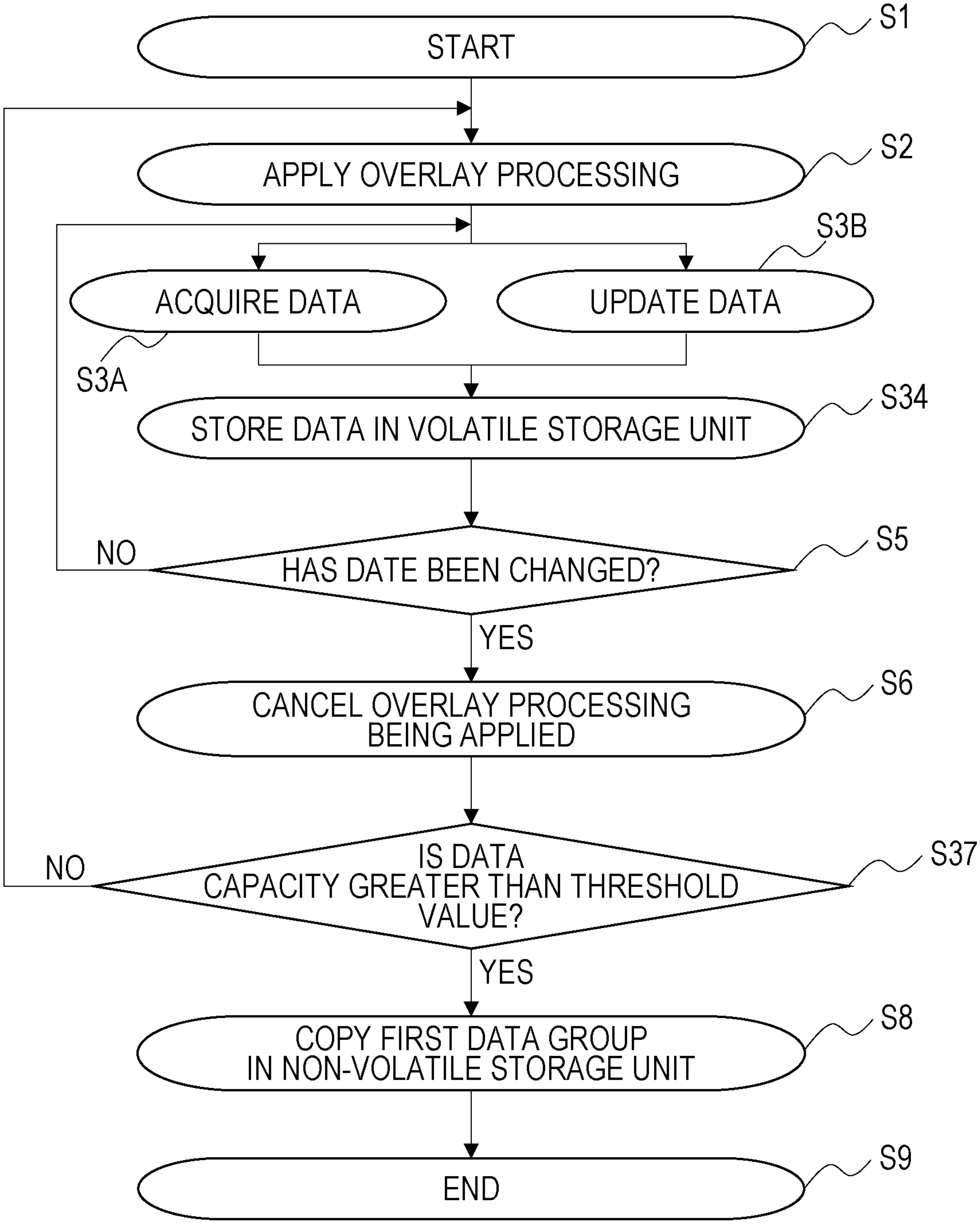
FIG. 7 is a flowchart illustrating a modification of the flow of the data processing method according to the embodiment.

A flow of the data processing method according to the embodiment will now be described herein. FIG. 7 is a flowchart illustrating a modification of the data processing method according to the embodiment. The flowchart illustrated in FIG. 7 includes S34 and S37 instead of S4 and S7 in the flowchart illustrated in FIG. 2, respectively, and other steps e similar or identical to those in the flowchart illustrated in FIG. 2. Therefore, S34 and S37 will now be described herein.

In S34, the processing circuit 400 reads and executes the data storage program 140 to write data in the volatile storage unit 310. At this time, a data capacity is added and stored.

In S37, the processing circuit 400 reads and executes the data capacity determination program 173 to determine whether or not to allow each of the pieces of data in the volatile storage unit 310 to be persisted. When the capacity of each of the pieces of data is larger than a predetermined threshold value (Yes), the flow proceeds to S8. When the data capacity is smaller than the threshold value (No), the flow returns to S2. This determination is performed for all the pieces of data.

With the configuration of the data processing program as described above, determination of persistence is performed based on the data capacity. Therefore, exchanging of information between the timer 500 and the processing circuit 400 is performed only when a timing at which date changes in S5 is determined, making it possible to reduce a number of times of exchanging of information.

Fourth Embodiment

As a modification of the first embodiment, an example in which a data creation time is used as a material for determining persistence of data will now be described herein. The data creation time refers to a period of time required from when data is first acquired to when determination of persistence is performed, and, when pieces of data that differ in type from each other are compared with each other, one with a longer data creation time is set to be subject to persistence. One reason of this determination is that it is considered that, as the data creation time increases, more information be included.

Figure 8:
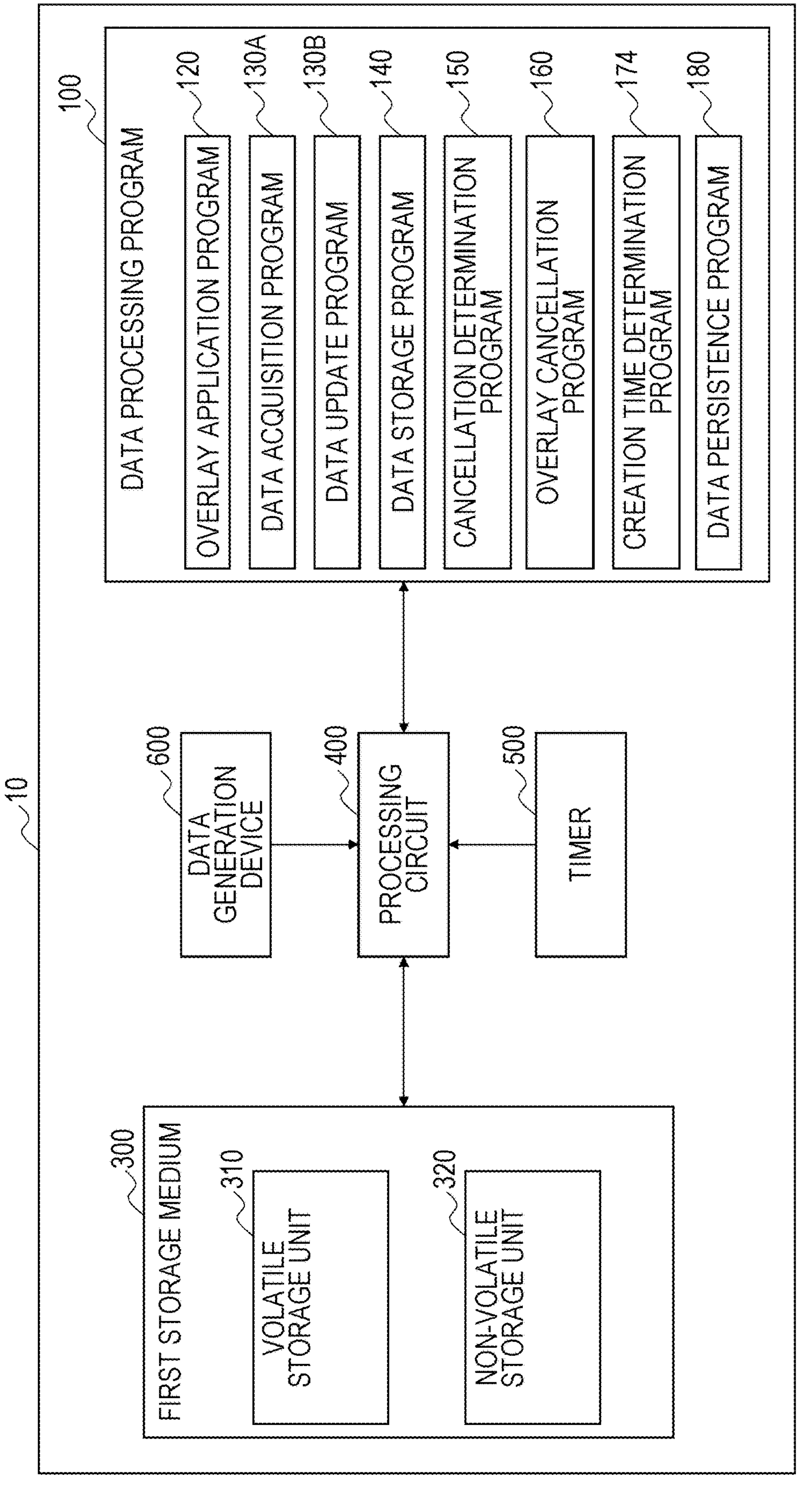
FIG. 8 is a block diagram illustrating a schematic modification of the data processing device according to the embodiment.

FIG. 8 is a block diagram illustrating a schematic modification of the data processing device according to the embodiment. The data processing device according to the fourth embodiment includes a creation time determination program 174 used to perform determination of persistence in accordance with a data creation time, instead of the elapsed time determination program 170 in the data processing program 100 illustrated in FIG. 1.

Figure 9:
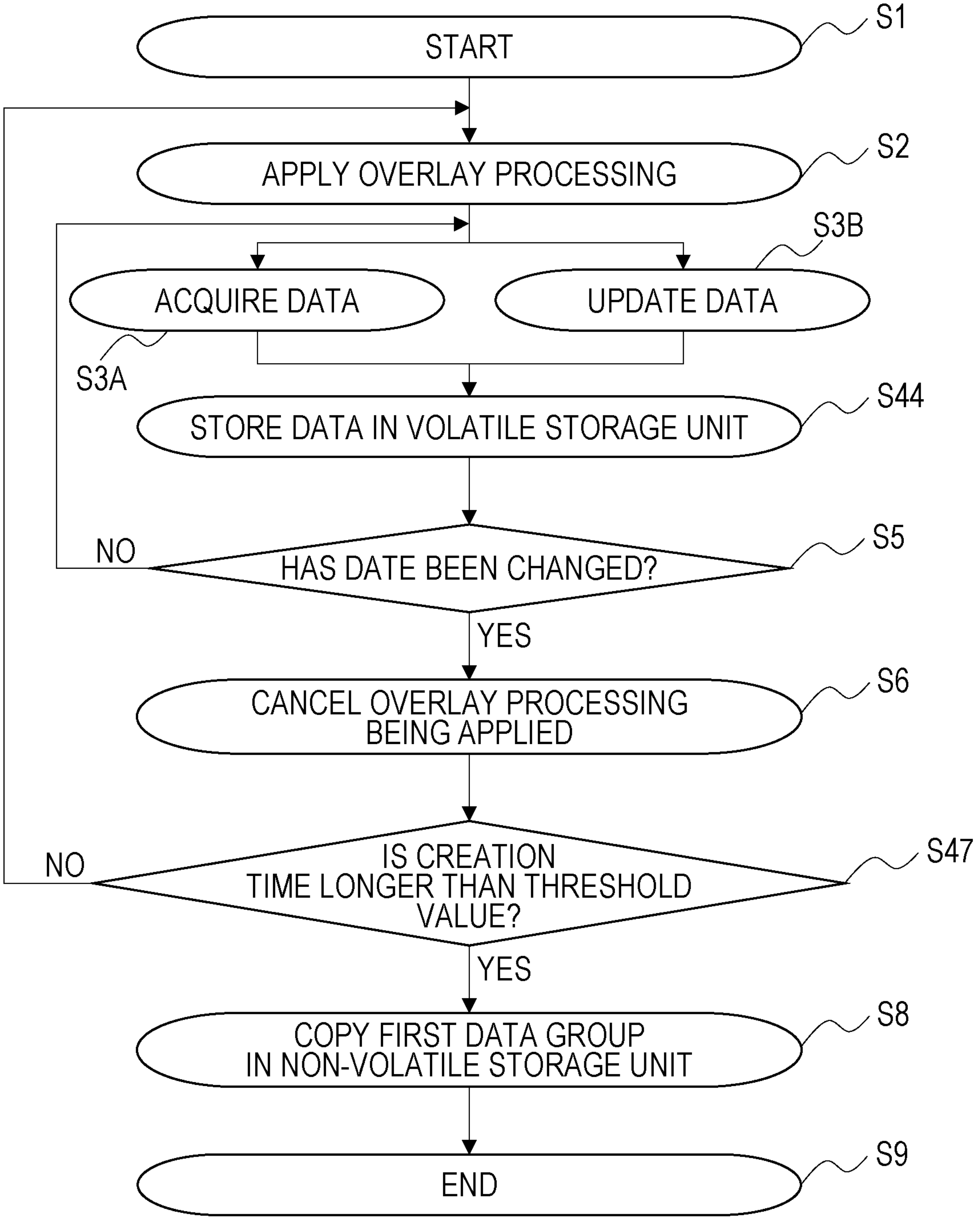
FIG. 9 is a flowchart illustrating a modification of the flow of the data processing method according to the embodiment.

A flow of the data processing method according to the embodiment will now be described herein. FIG. 9 is a flowchart illustrating a modification of the data processing method according to the embodiment. The flowchart illustrated in FIG. 9 includes S44 and S47 instead of S4 and S7 in the flowchart illustrated in FIG. 2, respectively, and other steps are similar or identical to those in the flowchart illustrated in FIG. 2. Therefore, S44 and S47 will now be described herein.

In S44, the processing circuit 400 reads and executes the data storage program 140 to write a result that data processing has been performed in the volatile storage unit 310. At this time, a data creation time is added to the result of the data processing and stored. The data creation time refers to a period of time from when data is first acquired from the data generation device 600 in S3 to a time when the data is stored in the volatile storage unit 310. Using the timer 500 makes it is possible to acquire respective times.

In S47, the processing circuit 400 reads and executes the creation time determination program 174 to determine whether or not to allow each of the pieces of data in the volatile storage unit 310 to be persisted. When the creation time of each of the pieces of data is longer than a predetermined threshold value (Yes), the flow proceeds to S8. When the creation time is shorter than the threshold value (No), the flow returns to S2.

With the configuration of the data processing program as described above, it is possible to determine that old data is subject to persistence.

Although some embodiments of the present invention have been described, these embodiments have been presented as examples, and are not intended to limit the scope of the invention. It is possible to implement these novel embodiments in various other forms. It is possible to make various omissions, substitutions, and changes without departing from the gist of the invention. These embodiments and modifications thereof are included in the scope and gist of the invention, and are included in the invention described in the claims and the equivalent scope thereof.

Appendixes pertaining to the embodiments of the present invention will now be described below.

<1> A data processing program when a storage medium includes a volatile storage unit and a non-volatile storage unit, the data processing program causing a processing circuit
- to designate the volatile storage unit as an upper layer and the non-volatile storage unit as a lower layer to apply overlay processing to at least a part of the storage medium,
- to store data in the volatile storage unit,
- to cancel the overlay processing being applied,
- to discriminate, based on a predetermined condition, the data into a first data group that is subject to persistence and a second data group that is not subject to persistence, and
- to store data of the first data group in the non-volatile storage unit.

<2> The data processing program described in <1>, in which an elapsed time from a last update date and time of the data is used as the predetermined condition.

<3> The data processing program described in <1> or <2>, in which the data of the first data group is a container image.

<4> The data processing program described in any one of <1> to <3>, in which
- a data capacity of the data is used as the predetermined condition.

<5> The data processing program described in any one of <1> to <4>, in which
- a creation time of the data is used as the predetermined condition.

<6> A data processing device including:
- a storage medium including a volatile storage unit and a non-volatile storage unit; and
- a processing circuit,
- in which the processing circuit
- designates the volatile storage unit as an upper layer and the non-volatile storage unit as a lower layer to apply overlay processing to at least a part of the storage medium,
- stores data in the volatile storage unit,
- cancels the overlay processing being applied,
- discriminates, based on a predetermined condition, the data into a first data group that is subject to persistence and a second data group that is not subject to persistence, and
- stores data of the first data group in the non-volatile storage unit.

<7> A data processing method when a storage medium includes a volatile storage unit and a non-volatile storage unit, the data processing method including:
- designating the volatile storage unit as an upper layer and the non-volatile storage unit as a lower layer to apply overlay processing to at least a part of the storage medium,
- storing data in the volatile storage unit,
- canceling the overlay processing being applied,
- discriminating, based on a predetermined condition, the data into a first data group that is subject to persistence and a second data group that is not subject to persistence, and
- storing data of the first data group in the non-volatile storage unit.

What is claimed is:

1. A data processing method when a storage medium includes a volatile storage unit and a non-volatile storage unit, the data processing method comprising:
- designating the volatile storage unit as an upper layer and the non-volatile storage unit as a lower layer to apply overlay processing to at least a part of the storage medium, wherein, while the overlay processing is applied, data is stored only in the volatile storage unit and the non-volatile storage unit is maintained as read-only,
- storing data in the volatile storage unit while the overlay processing is applied,
- canceling the overlay processing being applied, thereby enabling write operations to the non-volatile storage unit,
- discriminating, based on a predetermined condition, the data stored in the volatile storage unit into a first data group that is subject to persistence and a second data group that is not subject to persistence, and
- storing data of the first data group in the non-volatile storage unit.

2. The data processing method according to claim 1, wherein
- an elapsed time from a last update date and time of the data is used as the predetermined condition.

3. The data processing method according to claim 1, wherein
- the data of the first data group is a container image.

4. The data processing method according to claim 1, wherein
- a creation time of the data is used as the predetermined condition.

5. A data processing device comprising:
- a storage medium including a volatile storage unit and a non-volatile storage unit; and
- a processing circuit,
- wherein the processing circuit
- designates the volatile storage unit as an upper layer and the non-volatile storage unit as a lower layer to apply overlay processing to at least a part of the storage medium, wherein, while the overlay processing is applied, data is stored only in the volatile storage unit and the non-volatile storage unit is maintained as read-only,
- stores data in the volatile storage unit while the overlay processing is applied,
- cancels the overlay processing being applied, thereby enabling write operations to the non-volatile storage unit,
- discriminates, based on a predetermined condition, the data stored in the volatile storage unit into a first data group that is subject to persistence and a second data group that is not subject to persistence, and stores data of the first data group in the non-volatile storage unit.

6. A data processing method when a storage medium includes a volatile storage unit and a non-volatile storage unit, the data processing method comprising:

designating the volatile storage unit as an upper layer and the non-volatile storage unit as a lower layer to apply overlay processing to at least a part of the storage medium, wherein, while the overlay processing is applied, data is stored only in the volatile storage unit and the non-volatile storage unit is maintained as read-only, storing data in the volatile storage unit while the overlay processing is applied, canceling the overlay processing being applied, thereby enabling write operations to the non-volatile storage unit, discriminating, based on a data capacity of the data stored in the volatile storage unit into a first data group that is subject to persistence and a second data group that is not subject to persistence, and storing data of the first data group in the non-volatile storage unit.

7. The data processing method according to claim 6, wherein data having a data capacity larger than a predetermined threshold value is classified into the first data group.

8. The data processing method according to claim 6, wherein the data of the first data group is a container image.

* * * * *